(12) United States Patent
Debray et al.

(10) Patent No.: US 11,006,054 B2
(45) Date of Patent: May 11, 2021

(54) DEVICE FOR RADIATING OR RECEIVING ELECTROMAGNETIC WAVES

(71) Applicant: CANON KABUSHIKI KAISHA, Tokyo (JP)

(72) Inventors: Alexis Debray, Tokyo (JP); Takeaki Itsuji, Hiratsuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 354 days.

(21) Appl. No.: 15/965,498

(22) Filed: Apr. 27, 2018

(65) Prior Publication Data

US 2018/0249097 A1    Aug. 30, 2018

Related U.S. Application Data

(63) Continuation of application No. 14/383,081, filed as application No. PCT/JP2013/054055 on Feb. 12, 2013, now abandoned.

(30) Foreign Application Priority Data

Mar. 8, 2012   (JP) .................................. 2012-051951
Sep. 12, 2012  (JP) .................................. 2012-200301

(51) Int. Cl.
*G01J 5/02*     (2006.01)
*H04N 5/33*     (2006.01)
(Continued)

(52) U.S. Cl.
CPC ................ *H04N 5/332* (2013.01); *G01J 5/10* (2013.01); *H01Q 9/16* (2013.01); *H01Q 23/00* (2013.01); *G01J 2005/106* (2013.01)

(58) Field of Classification Search
CPC ....... H04N 5/332; G01J 5/10; G01J 2005/106
See application file for complete search history.

(56) References Cited

U.S. PATENT DOCUMENTS 4,888,597 A    12/1989  Rebiez
6,061,026 A     5/2000  Ochi et al.
(Continued)

FOREIGN PATENT DOCUMENTS

CN          1051828 A    5/1991
CN          1784810 A    6/2006
(Continued)

OTHER PUBLICATIONS

Ali-Ahmad W Y et al; "AN 86-106 GHZ Quasi-Integrated Low Noise Schottky Receiver;" IEEE Transactions on Microwave Theory and Techniques; vol. 41, No. 4, Apr. 1993; pp. 558-563; XP 000385917.

*Primary Examiner* — David P Porta
*Assistant Examiner* — Mamadou Faye
(74) *Attorney, Agent, or Firm* — Canon U.S.A., Inc. IP Division

(57) ABSTRACT

The present invention relates to a device for radiating or receiving an electromagnetic wave. The device includes a substrate including a recess coated by a material that reflects the electromagnetic wave, a metal portion that radiates or receives the electromagnetic wave, and an electronic element connected to the metal portion on the substrate. The metal portion includes a portion provided above an opening of the recess and a portion which is located on the substrate and connected to the electronic element.

16 Claims, 15 Drawing Sheets

(51) Int. Cl.
*H01Q 9/16* (2006.01)
*H01Q 23/00* (2006.01)
*G01J 5/10* (2006.01)

(56) References Cited

U.S. PATENT DOCUMENTS

| | | | |
|---|---|---|---|
| 6,707,429 B1 * | 3/2004 | Siegel | H01Q 1/27 343/700 MS |
| 8,629,423 B1 * | 1/2014 | Kislov | H01L 31/1085 250/214.1 |
| 2006/0055610 A1 | 3/2006 | Borisov | |
| 2008/0062066 A1 * | 3/2008 | Arai | H01Q 21/29 343/867 |

FOREIGN PATENT DOCUMENTS

| | | |
|---|---|---|
| CN | 101118986 A | 2/2008 |
| CN | 102203949 A | 9/2011 |
| CN | 102361111 A | 2/2012 |
| EP | 858126 A2 | 8/1998 |
| JP | H08-056113 A | 2/1996 |
| JP | H10-224141 A | 8/1998 |
| JP | H11-122032 A | 4/1999 |
| JP | 2005-198335 A | 7/2005 |
| JP | 2005-233842 A | 9/2005 |
| JP | 2006-064679 A | 3/2006 |
| JP | 2007-235199 A | 9/2007 |
| JP | 2007-266835 A | 10/2007 |

* cited by examiner

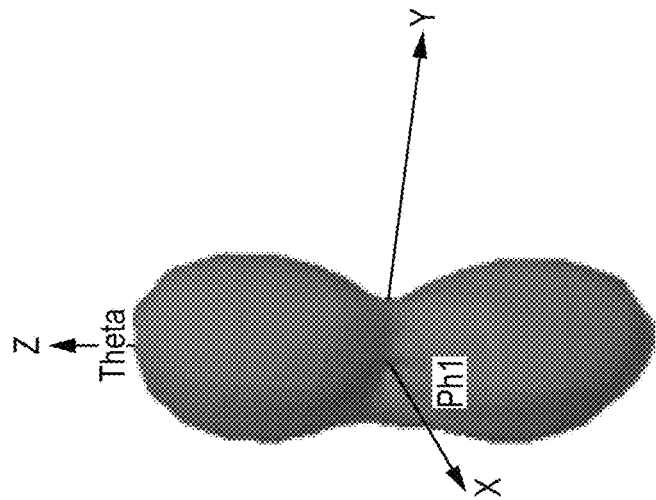
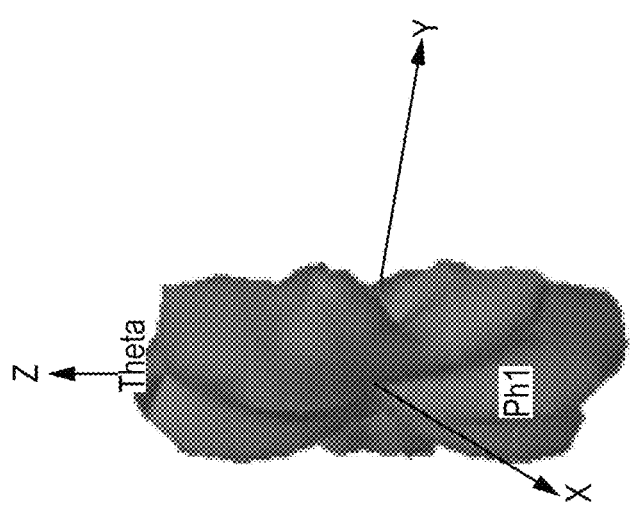
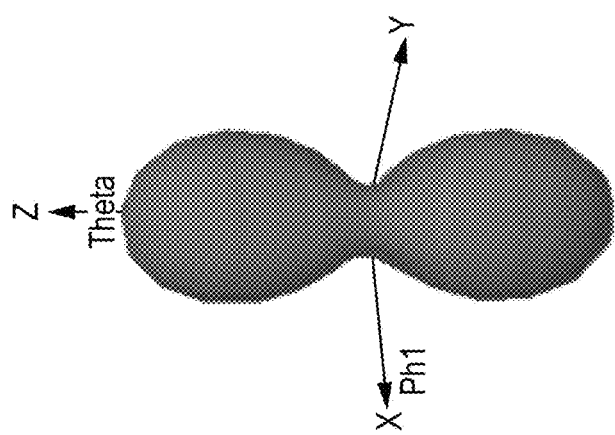

DEPRESSION OF RECESS 1302

DEVICE FOR RADIATING OR RECEIVING ELECTROMAGNETIC WAVES

CROSS-REFERENCE TO RELATED APPLICATIONS

This application is a Continuation of U.S. application Ser. No. 14/383,081, filed Sep. 4, 2014, which is a National Phase Application of International Application PCT/JP2013/054055, filed Feb. 12, 2013, which claims priority from Japanese Patent Applications No. 2012-051951, filed Mar. 8, 2012 and No. 2012-200301 filed Sep. 12, 2012, which are hereby incorporated by reference herein in their entireties.

TECHNICAL FIELD

The present invention relates to a device for radiating or receiving an electromagnetic wave, in particular to a device for radiating or receiving an electromagnetic wave whose frequency is in the terahertz range (that is, a range from 30 GHz to 30 THz, hereinafter referred to as "THz range").

BACKGROUND ART

Usually, a device for radiating or receiving an electromagnetic wave includes a radiating element formed by a metallic structure and an electronic circuit for signal processing. The size of the radiating element is usually the same as the wavelength of the electromagnetic wave to be received or to be radiated. When the frequency of the electromagnetic wave reaches the THz range, the size of the radiating element is in the submillimeter range, so that the radiating element can be directly integrated on a substrate on which the electronic circuit has already been integrated. VLSI fabrication techniques can be used for manufacturing both the radiating element and the electronic circuit.

The electrical resistance of the radiating element of the device for receiving an electromagnetic wave needs to match that of the signal processing circuit in order to obtain a high sensitivity. Here, fine patterning is required for the signal processing circuit as the effective frequency capability increases, resulting in an increase in the resistance of the signal processing circuit. As a result, the resistance of the radiating element needs to be high in order for the device to receive a high frequency electromagnetic wave with high sensitivity.

Here, the signal processing circuit is usually manufactured using VLSI techniques, so that the signal processing circuit is integrated on a semiconductor substrate. In this case, a simple method for manufacturing the radiating element of the antenna is to manufacture a metal pattern (metal portion) on the semiconductor substrate by using the same VLSI techniques. However, the relative permittivity of semiconductors is usually large. For example, the relative permittivity of silicon is 12.1. A high relative permittivity means that an electric field is more easily generated in this medium than in a material having a lower relative permittivity. As a result, the radiation resistance of an antenna which radiating element is placed on a semiconductor with a high relative permittivity is lower that than of the same element placed in or on a medium with a lower relative permittivity. Therefore, some inventions have been reported to increase the radiation efficiency of integrated antennas.

Rebiez, et al., U.S. Pat. No. 4,888,597 (PTL 1) reports an integrated antenna for transmitting or receiving a millimeter or submillimeter electromagnetic wave. The integrated antenna is manufactured by combining two substrates (35 and 40) to form an array with a horn structure having a pyramidal shape as shown in FIG. 12. A membrane 45 spreads as a connection portion between the two substrates inside each horn. The membrane is electrically transparent. There is a metal pattern that functions as an antenna (radiating element) 54 on the membrane. A processing circuit is mounted between the substrates. The purpose of this device is to strengthen the electromagnetic pattern generated by the antenna by concentrating the electromagnetic energy thanks to the pyramidal shape of the horn.

A second purpose of the integrated antenna is to reduce the electromagnetic coupling between the antennas. However, although this invention improves the electromagnetic pattern of the antenna and reduces the electromagnetic coupling, this invention does not particularly improve the radiation impedance of the antenna. For example, PTL 1 does not discuss the electrical connection between the antenna (radiating element) and the processing circuit. According to PTL 1, the antenna is placed at the center of the membrane and the processing circuit is placed between the two substrates. As a result, the antenna and the processing circuit are far away from each other. There is a connection portion between the processing circuit placed between the substrates and the radiating element. This connection portion radiates an electromagnetic wave, especially inside the substrate, so that the radiation impedance of the radiating element varies from its ideal value.

The manufacturing process of this invention is complex. The integrated antenna uses two substrates that must be assembled. This may require a complex technique such as wafer bonding and wafer alignment. Furthermore, it is difficult for current micro-manufacturing techniques to accurately perform etching for the large depth required to manufacture the horn. Finally, the shape of the final integrated antennas is uneven (not flat). Therefore, it is difficult to integrate other elements such as an array of microlenses.

U.S. Pat. No. 6,061,026 (PTL 2) reports a monolithic microwave/millimeter-wave antenna device. The device includes a substrate, an electronic circuit provided along with the substrate, an opening in the substrate, a stripline antenna located above the opening, a horn which is provided along with the substrate and aligned with the opening, and a cover above the stripline antenna. In the device, some freedom is given to the shape that can be achieved for the horn and the materials that can be selected for the cover, the horn, and the material for finally filling the horn. However, if the size of the device is reduced to a size required for the THz range, it is expected that the manufacturing of the device will be difficult. For example, the depth of the opening in the substrate is greater than the considered wavelength. In practice, the wavelength at 1 THz is 300 μm, but a standard thickness for a 4-inch wafer is 525 μm, and thinner thicknesses are difficult to handle during the manufacturing process. Furthermore, the size of the stripline antenna in the THz range is smaller than that for microwaves, so that it is expected that the alignment between the stripline antenna and the opening will be difficult. It is possible that the opening needs to be etched after depositing the stripline antenna and that this etching must be performed from the backside. In this case, it is extremely difficult to appropriately align the stripline with the outer shape of the opening appearing on the surface.

Japanese Patent Laid-Open No. 2006-064679 (PTL 3) discloses a device for receiving or generating an electromagnetic wave. One purpose of this device is to enhance the antenna characteristics by placing the antenna on a supporting portion away from the substrate.

CITATION LIST

Patent Literature

PTL 1 U.S. Pat. No. 4,888,597
PTL 2 U.S. Pat. No. 6,061,026
PTL 3 Japanese Patent Laid-Open No. 2006-064679

SUMMARY OF INVENTION

Technical Problem

PTL 1 has the capability to provide a radiating element having a high radiation resistance. However, in the manufacturing process of the radiating element, several wafers are included and the alignment of the radiating element and the opening is not good when the radiating element is suitable for the THz range. Furthermore, the surface of the substrate is not flat, so that the manufacturing process becomes complex. As a result, it is difficult to obtain the desired radiation resistance for the radiating element and therefore it is difficult to achieve a good impedance matching between the radiating element and the signal processing circuit in addition to the problem of the electrical connection described in the Background Art.

Solution to Problem

The present invention provides a device for radiating or receiving an electromagnetic wave, in which the radiation resistance of the radiating element is sufficiently high to match the high resistance of the signal processing circuit and with the possibility of having a flat surface for the substrate. Also, the present invention provides a manufacturing method of the device for radiating or receiving an electromagnetic wave.

Therefore, as an aspect of the present invention, a device for radiating or receiving an electromagnetic wave includes a substrate including a recess coated by a material that reflects electromagnetic waves, a metal portion that radiates or receives the electromagnetic wave, and an electronic element connected to the metal portion on the substrate. The metal portion includes a portion provided above the recess and a portion which is located on the substrate and connected to the electronic element.

Also, as an aspect of the present invention, a manufacturing method of a device for radiating or receiving an electromagnetic wave includes a step of forming a metal portion that radiates or receives the electromagnetic wave, and a step of forming a recess coated by a material that reflects the electromagnetic wave in the substrate so that the metal portion includes a portion provided above the recess and a portion which is located on the substrate and connected to an electronic element.

As the metal portion is partially surrounded by air or partially resting on a material with a low relative permittivity compared to that of the semiconductor substrate, it is more difficult to emit electromagnetic radiations as compared to the case when it is resting solely on the semiconductor substrate. As a result, the radiation resistance of the metal portion is high, so that the impedance of the metal portion better matches the high impedance of the signal processing circuit. Therefore, if the metal portion is used as a sensor, the metal portion provides high sensitivity, and if the metal portion is used as a radiating element, the metal portion provides a high radiation rate.

Also, the manufacturing method of a device for radiating or receiving an electromagnetic wave as another aspect of the present invention requires only one substrate, so that the manufacturing method has an advantage that the device can be easily manufactured.

Further features of the present invention will become apparent from the following description of exemplary embodiments with reference to the attached drawings.

BRIEF DESCRIPTION OF DRAWINGS

FIGS. 15A, 15B, and 15C are an analysis result related to directivity of the device of the fifth embodiment.

DESCRIPTION OF EMBODIMENTS

First Embodiment

Figure 1:
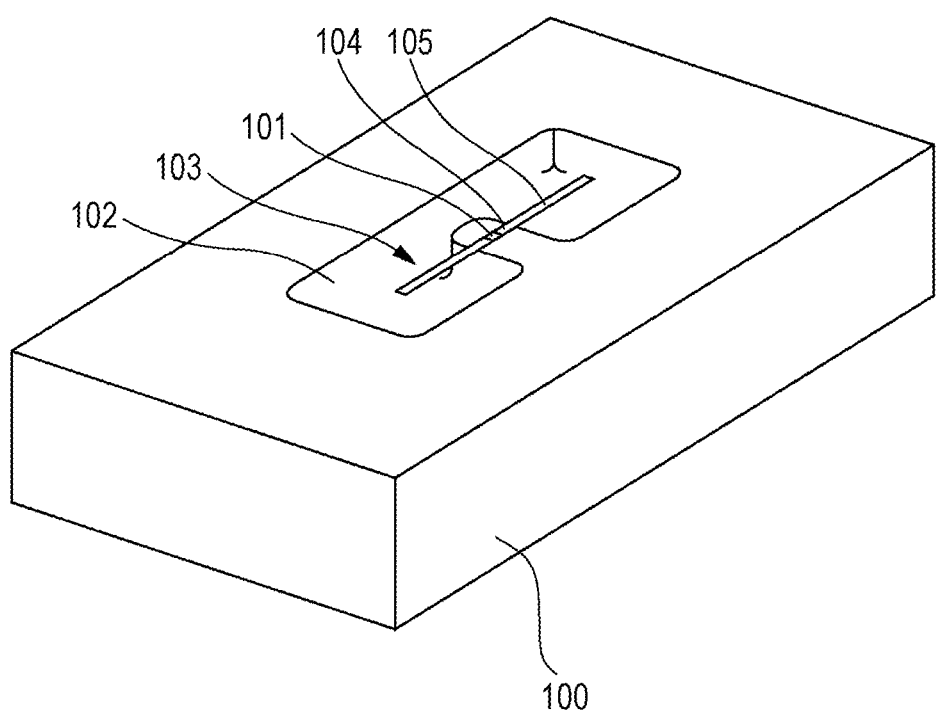
FIG. 1 is a perspective view showing a device of the first embodiment of the present invention.

FIG. 1 shows a perspective view of the device. The device is configured based on a substrate 100 including an electronic element 101 which is a signal processing circuit. For example, the substrate is formed from a semiconductor wafer. The wafer can be manufactured from silicon, GaAs, InP, or another semiconductor material. The electronic element 101 can be manufactured by integrating the electronic element 101 on a semiconductor substrate by using VLSI technique.

The electronic element 101 is disposed not on the recess 102 but on the substrate. However, it is desired that the electronic element 101 is disposed at a location near the recess considering a positional relationship with the metal portion 103 used as the radiating element. Therefore, it is desired to form a convex portion of the substrate inside the recess and form the electronic element 101 on the convex portion of the substrate.

The recess 102 coated by a material that reflects electromagnetic waves is provided in the substrate. For example, when the substrate is manufactured from silicon, the recess 102 can be manufactured by dry etching using plasma from SF6 gas, wet etching using KOH or TMAH, or chemical etching using XeF2. Also, the recess 102 can be manufactured by using sand blasting or laser ablation. Some of the above techniques can be also used to etch a substrate formed from other materials. As a result, the recess coated by a material that reflects electromagnetic waves can be manufactured from various materials in various shapes. At this time, the recess 102 has a wall in the substrate as shown in FIG. 1 and a discontinuous surface of permittivity is formed, so that the recess 102 has a surface that reflects electromagnetic waves to be radiated or to be received. There may be only the substrate surface, or as described later, the reflectivity may be improved by covering the substrate surface by a metal film. As shown in FIG. 1, the entire wall for reflecting the electromagnetic waves is typically covered. However, in principle, the surface only has to reflect electromagnetic waves to be activated, and even when there is a gap, a protrusion, a hole, a mesh, a wire structure, or the like of a size smaller than or equal to $1/20$ (in the THz range, tens of micron meters) of the wavelength of the electromagnetic waves, the surface can be defined as a reflecting surface in the present invention. In the electromagnetic field theory, generally, a structure with a size of $\lambda/20$ or less has an extremely small effect on reflection, refraction, and scattering, and the effect is indexed as a mesh size in a computer simulation such as the finite element method. The above is well known by those skilled in the art. In other words, there is no hole or the like, which does not reflect electromagnetic waves and through which electromagnetic waves pass, in the wall that covers the recess.

The metal portion 103 is physically and electrically connected to the electronic element 101. The metal portion functions as a radiating element or a receiving element. The metal portion receives or radiates an electromagnetic wave propagating in air and transmits the energy and the signal of the electromagnetic wave to the electronic element. The metal portion can be manufactured by using thin film technique. For example, a recess is formed in the substrate, and then the recess is temporarily refilled with a material. Thereafter, a metal layer is deposited on the substrate and the metal layer is patterned by photolithography and metal etching, so that the metal portion is formed. After the metal portion is formed, the material with which the recess was filled is removed by fusion, etching, or underetching. The metal portion can also be manufactured by using structure movement from a carrier substrate or self-assembly such as fluidic self-assembly. The metal portion includes two portions. One portion 104 is located on the substrate and connects to the electronic element 101. The other portion 105 is located above the opening of the recess 102. At this time, if the electronic element has two electrodes (not shown in the drawings), the metal portion that forms the radiating element 103 can have a configuration including a small gap 110 at a position at which the electronic element 101 is located. Although the portion 104 of the metal portion located on the substrate is necessary to connect to the electronic element 101, it is desired that the amount of the portion 104 is as small as possible concerning the characteristics of the radiating element 103 because the smaller the amount of the portion 104, the smaller the effect of discontinuity of the radiating element. The length of the portion 104 of the metal pattern on the substrate is typically 5 μm to 10 μm, and preferably 2 μm, though the length depends on the lithography process to form the metal pattern. It is assumed that the device is used as an emitter. The metal portion 103, which is the radiating element, partially radiates into the substrate 100 and partially radiates into the air with which the recess 102 is filled. If the metal portion radiates only into the substrate, the radiation resistance of the metal portion is assumed to be small because the relative permittivity of the substrate is large. The metal portion partially radiates into the air provided by the recess, so that the metal portion has a larger radiation resistance because the relative permittivity of the air is small. Thereby, the radiation resistance of the metal portion can match that of the electronic element.

Some modified examples of the first embodiment will be described.

To facilitate the manufacturing process, and further, to reinforce the portion of the radiating element located above the opening of the recess, it is desired that the recess is filled with a solid material. For example, the recess can be filled with BCB (benzocyclobutene). BCB is generally used in MEMS and is a dielectric material having a low relative permittivity of about 2.4 in the THz range. The recess can be filled with an appropriate material by using spin coating, spray coating, or micro-dispensing. If necessary, the upper surface of the material with which the recess is filled can be flattened by using a chemical or mechanical flattening technique. In this case, the level of the upper surface of the material with which the recess is filled is basically the same as that of the upper surface of the substrate. Therefore, the metal portion which forms the radiating element can be manufactured by using metal deposition and VLSI techniques such as photolithography and patterning by metal etching. Since the surface on which the metal portion is formed is flat, spin coating and a conventional mask aligner can be used for the photolithography. The surface of the device obtained as a result of the above process is essentially flat, so that, for example, microlenses can be further integrated by using VLSI techniques.

Figure 2:
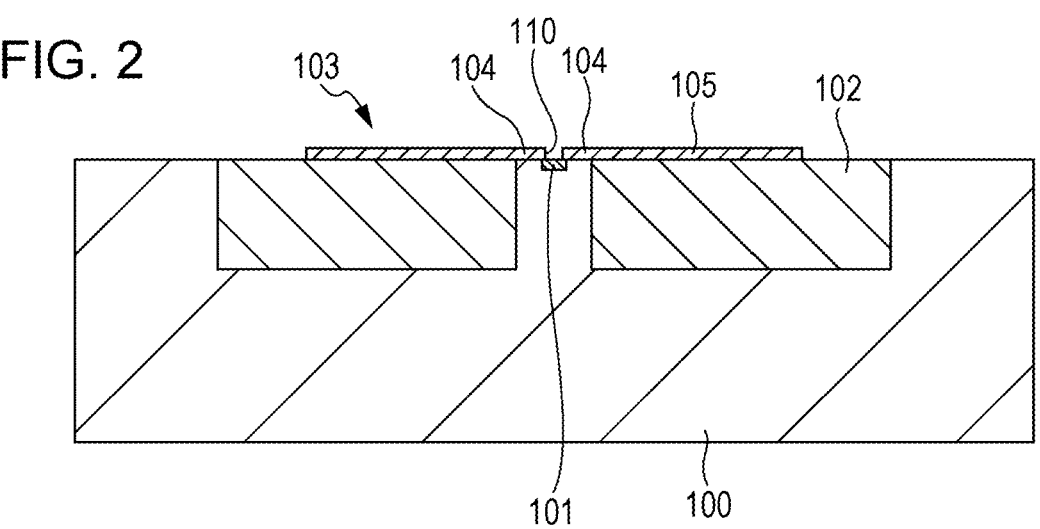
FIG. 2 is a cross-sectional view of a device according to the first embodiment having a recess in which the side surfaces and the bottom surface are perpendicular to each other.
Figure 3:
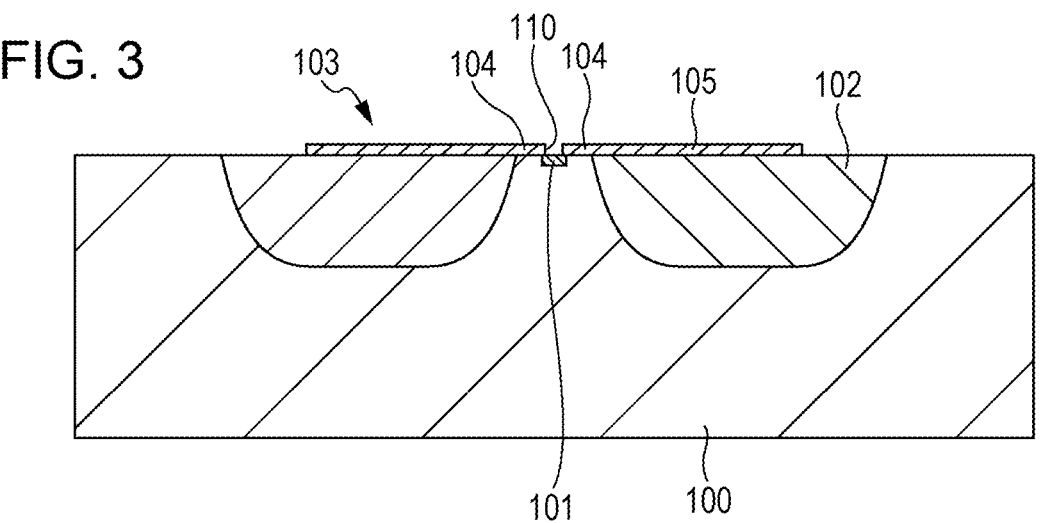
FIG. 3 is a cross-sectional view of a device according to the first embodiment having a recess in which the connection portion between the side surface and the bottom surface is curved.

In another modified example of the first embodiment, the wall of the recess is curved. FIG. 2 shows a cross-sectional view of a device which is an example of the first embodiment of the present invention in which the portions that connect the side surfaces and the bottom surface of the recess are perpendicular to each other. As another example, FIG. 3 shows a cross-sectional view of a device which is an example of the first embodiment of the present invention in which the walls of the recess are curved. Curving the walls of the recess has two advantages. First, it can facilitate the manufacturing process. For example, when the recess is filled with a material, if there is no sharp corner at the bottom surface of the recess, it is easier to fill the recess with a material whose permittivity is lower than that of the substrate. Second, when the wall of the recess is curved, it is possible to prevent a standing wave from being present in the recess, so that the radiating element can easily radiate upward. If the substrate is formed of silicon, it is possible to easily manufacture the curved wall of the recess in the substrate by using isotropic etching such as SF6-based plasma etching or XeF2 etching. If the substrate is formed of another material, it is possible to easily manufacture the curved wall of the recess by using laser ablation.

In another modified example of the first embodiment, the entire shape of the recess is demarcated. Although various shapes of radiating elements have been reported, it is desirable to select a radiating element including one or several filamentous metal shapes for the purpose of design. More specifically, the radiation pattern is a dipole or a coil. In this case, it is known that the magnetic field generated by the radiating element rotates around the element by Ampere's rule. As a result, it is possible to more effectively radiate an electromagnetic wave if the recess has a shape which is similar to the shape of the radiating element and which has a size larger than that of the radiating element so as to surround the radiating element. In this case, a portion of the substrate which protrudes into the recess to hold the electronic element is provided, and the electronic element and part of the radiating element are placed on the protruding portion of the substrate. It is necessary for the part of the radiating element on the substrate and a part of the radiating element located above the opening of the recess to be close to each other.

Although various electronic elements can be considered to process a signal generated by the radiating element, rectifying elements can be used because they can be easily manufactured and can operate at frequencies higher than 1 THz. Among the rectifying elements, the Schottky barrier diode has been studied for tens of years in the THz range, so that it is desired that the structure of the present invention is used to cause the Schottky barrier diode to operate as a receiving device to improve its characteristics. The THz range is a range from 30 GHz to 30 THz. In particular, a frequency range from 0.1 THz to 10 THz is effective. Here, as shown in the present embodiment and FIGS. 1 to 3, it is not intended that the recess penetrates the substrate. Typically, the radiating element is surrounded by a recess which size is smaller than the operating wavelength. The specific sizes of the recess will be clarified in the embodiments described below.

Second Embodiment

At the interface between the air and the recess, there is a discontinuity of permittivity and magnetic permeability. As a result of this discontinuity, the electromagnetic wave radiated from the radiating element is partially reflected and partially transmitted into the substrate. The electromagnetic wave transmitted into the substrate may disturb other components integrated on the substrate, depending on the usage. For example, when several devices are formed on the same substrate, as an array in order to sense an image, one device receives an electromagnetic wave, and during the reception, an electromagnetic wave re-radiated by the device is transmitted into the substrate. The re-radiated electromagnetic wave is received by another device, and a false image may be generated.

Figure 4:
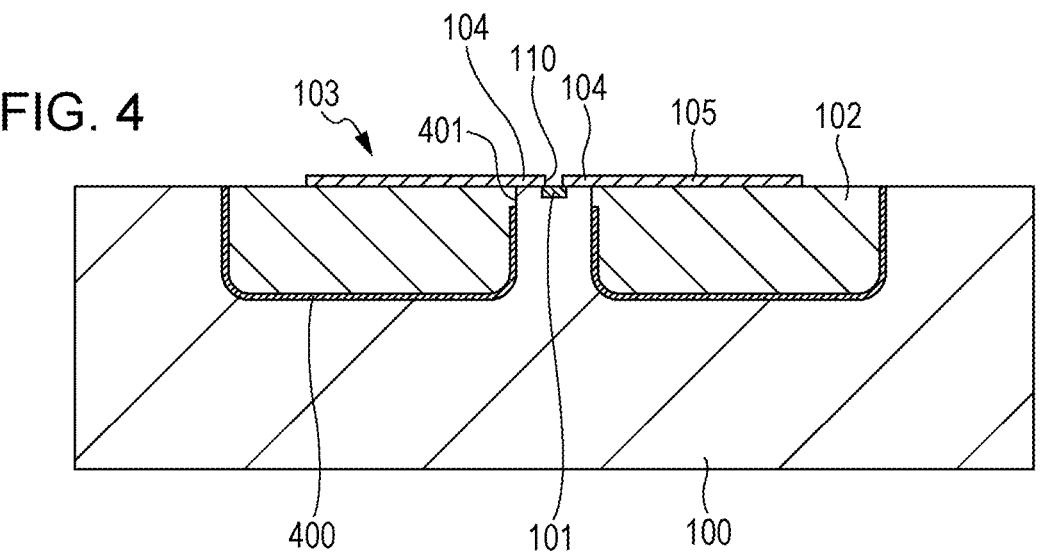
FIG. 4 is a cross-sectional view of a device according to the second embodiment in which the recess is coated with a material different from that of the substrate.

The second embodiment solves this problem of the present invention. FIG. 4 shows a cross-sectional view of the device according to the second embodiment. A metal layer 400 is provided on the wall of the recess 102. Since there is the metal layer 400, the radiation radiated from the portion 105 of the radiating element 103 located above the recess is reflected by the metal layer, so that the radiation does not enter the substrate. On the other hand, there is no metal layer between the substrate and the portion 104 of the radiating element 103 located on the substrate, so that a part of the electromagnetic wave is transmitted into the substrate. Therefore, it is important to reduce as much as possible the portion 104 of the radiating element located on the substrate with respect to the entire radiating element so as to reduce the noise component. Although depending on the manufacturing method, it is possible to further reduce the propagation of the electromagnetic wave in the substrate by providing a structure of a metal layer and an insulating layer between the substrate and the portion 104 of the radiating element. In this case, the insulating layer is inserted so that the portion 104 of the radiating element located on the substrate is not in contact with the metal layer.

If the wall of the recess 102 is completely covered by the metal layer 400, the metal layer is in contact with the radiating element 103 at the boundary between the portion 104 and the portion 105 of the radiating element. If the metal layer is in contact with the radiating element 103, there is a risk that the radiation characteristics of the radiating element 103 are changed. Therefore, it is desired to provide a portion 401 that is not covered by the metal layer 400 (or a portion where the substrate surface forms a side wall in the recess structure) on the wall of the recess 102 near the boundary between the portion 104 and the portion 105 of the radiating element. In other words, it is desired to form a portion that is not covered by the metal layer at a portion where the edge of the wall of the recess in the substrate and the metal layer are in contact with each other.

The metal layer 400 can be manufactured by using a usual metal deposition technique and patterning by photolithography and metal etching. If the recess is too deep to use spin coating for the photolithography, spray coating can be used. The portion 401 that is not covered by the metal layer can be demarcated by normal photolithography, 3D photolithography if necessary, or laser ablation. In this embodiment, a metal layer has been described. However, it is not necessary to use a metal layer if the recess is formed in a conductive material, into which electromagnetic waves never propagate. This is the case, for example, when the substrate is made of a highly doped semiconductor.

Third Embodiment

It is well known that a coil antenna can be operated so that it has a large radiation resistance. Therefore, an embodiment will be described in which the radiating element, designed to have a radiation resistance matching the high resistance of an electronic processing circuit in the THz range, has a coil shape. This is a purpose of a third embodiment.

Figure 5:
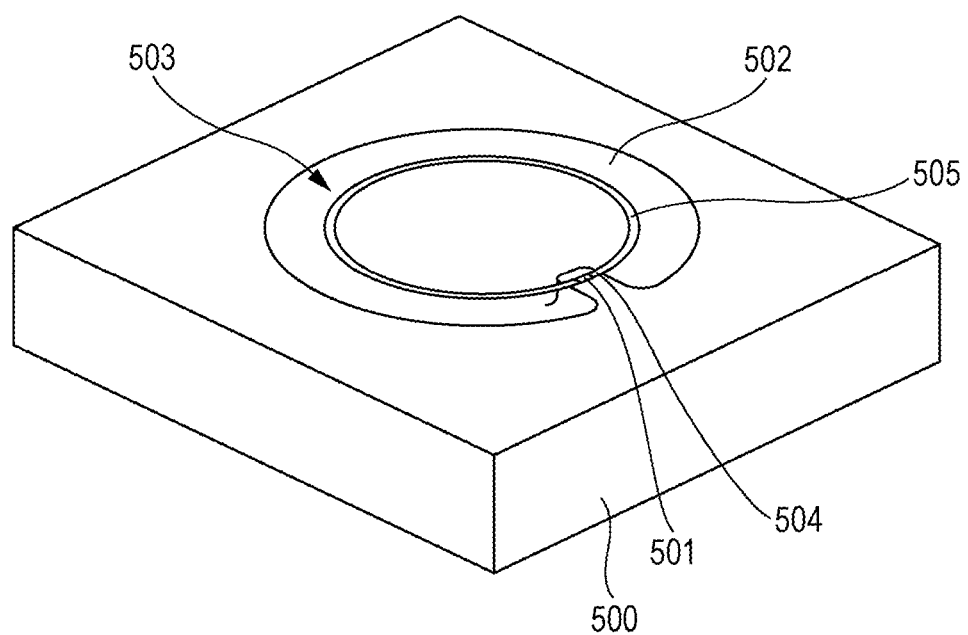
FIG. 5 is a perspective view showing a device of the third embodiment of the present invention.

FIG. 5 shows a perspective view of a device according to the third embodiment of the present invention. In the same manner as in the first embodiment, a substrate 500 includes an electronic element 501. In particular, the electronic element 501 is integrated on the substrate. For example, the substrate 500 is a silicon substrate in which a Schottky barrier diode is used as the electronic element 501. The Schottky barrier diode is integrated on the substrate and manufactured by using VLSI techniques. In the same manner as in the first embodiment, a metal pattern 503 is provide and used as the radiating element. The metal pattern has a coil shape that generates a radiation resistance higher than that of antennas having other shapes. For example, Ti, Au, or the like is used as a metal material. However, it is not limited to those. A recess 502 is also provided in the substrate 500. In the same manner as in the first embodiment, when the substrate 500 is formed of silicon, the recess 502 can be manufactured by various techniques such as silicon etching, sand blasting, or laser ablation. One portion 505 of the metal portion 503 is located at above the opening of the recess 502 provided in the substrate 500 in order to further increase the radiation resistance of the metal portion 503. In the same manner as in the first embodiment, the recess 502 can be filled with a material having a relative permittivity lower than that of a material of the substrate 500. For example, the recess 502 can be filled with BCB (benzocyclobutene). This material can provide a mechanical support to the portion 505 of the metal portion 503 as well as facilitate the manufacturing process. The metal portion 503 also includes another portion 504 which is located on the substrate and mechanically (physically) and electrically connects to the electronic element 501.

Figure 6:
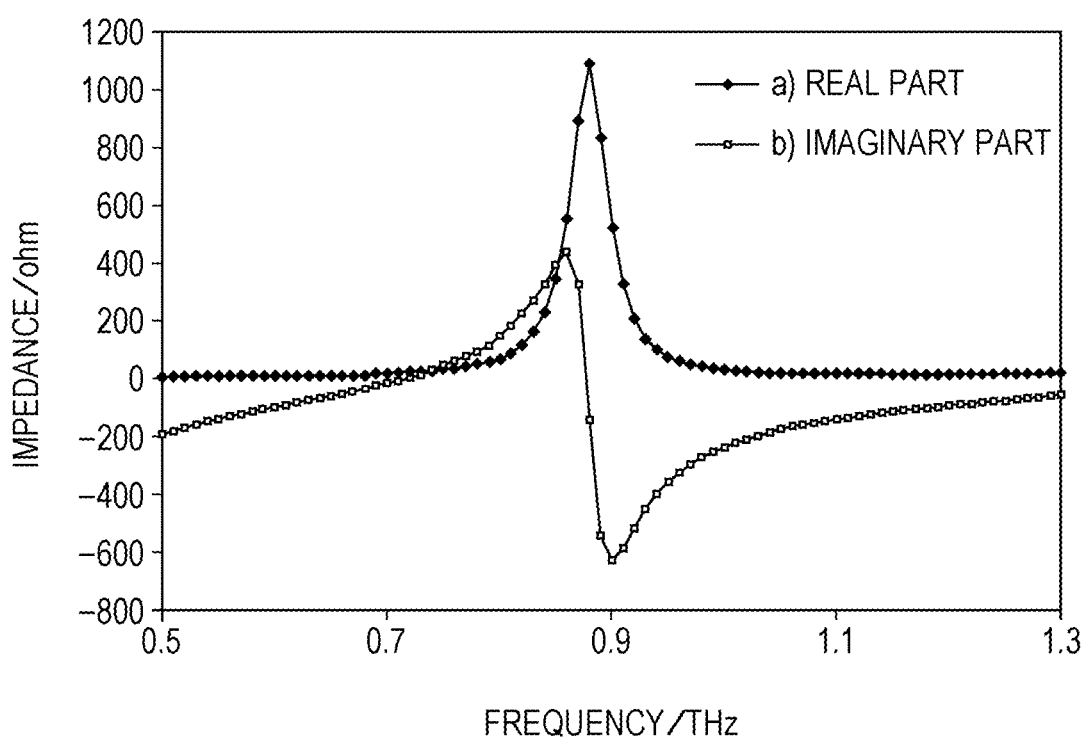
FIG. 6 is a diagram showing the radiation impedance according to the device of the third embodiment simulated by HFSS.

FIG. 6 shows the calculation result of an example of the third embodiment of the present invention performed by the commercially available simulator HFSS. FIG. 6 shows the radiation impedance (real part and imaginary part) as a function of frequency around 1 THz. In this example, the radius of the coil is 50 μm and the width of the wire of the coil is 4 μm. The depth of the recess is 15 μm. The recess is coated by a thin metal layer as described in the second embodiment except for a portion near the coil in order to avoid an electrical contact between the metal coating and the coil. The simulation is performed in a state in which the entire recess 502 is filled with BCB and the coil is located above the recess 502. The distance between the coil and the outer edge of the recess is about 45 μm. The substrate is formed of silicon and the electronic element that functions as an emitter in the simulation is integrated on the substrate. The simulation indicates that a radiation resistance greater than 1000Ω can be achieved near 0.9 THz. In the present embodiment, an example has been described in which the radiating element is mainly operated near 0.9 THz. The wavelength of the radiation is about 333 μm (free space) and the size of the recess (depth, radius of outer circumference, and the like) is smaller than the wavelength, so that the effect intended by the present invention is achieved. When the radiating element is operated at a frequency other than the frequency exemplified in the present embodiment, the recess may be designed by using HFSS or the like in the same manner as in the present embodiment and the size of the recess may be changed according to the wavelength of the electromagnetic wave to be radiated or received.

The structure of the device is relatively simple and formed from only one substrate. Furthermore, the radiating element, the electronic circuit, and the recess can be manufactured on the same surface of the substrate, so that an accurate alignment can be achieved. Finally, the final surface of the substrate is flat, so that, for example, a manufacturing process to integrate microlenses can be realized.

Here, an example of a basic manufacturing process will be described. As described above, an electronic element (here, a Schottky barrier diode) is formed on the Si substrate by using VLSI techniques or the like. As shown in FIG. 5, except for a portion where the electronic element is disposed, a circular recess structure with a radius of 95 μm is etched to a depth of 15 μm by photolithography and the methods described above. At this time, the electronic element is disposed at a position where it can be connected without changing the shape of the circular (coil) metal portion described later. Next, a metal film such as Ti or Au is deposited on the wall of the recess formed in the Si substrate. In this case, the metal film is deposited on the entire surface, and then photolithography is performed for forming a resist pattern only on the recess, and finally the metal film on the flat portion is removed by etching. BCB is deposited on the entire surface of the substrate by spin coating or the like and an etch back is performed so that the flat portion of the substrate is exposed. When the entire surface is flattened, a circular metal portion with a radius of 50 μm and a width of 4 μm is formed over the BCB and the substrate including the electronic element so that the center of the circle of the circular metal portion corresponds to the center of a circle formed by the outer edge of the recess. At this time, the metal portion is formed to be connected to the electrodes of the electronic element. Of course, the metal portion, which is formed not to make a short circuit between the electrodes of the electronic element, includes a gap (gap 110 in FIG. 2). Here, the radius of the circular metal portion is 50 μm, so that the length of the circular metal portion is about 314 μm. The length of the circular metal portion located on the substrate is about 2 to 10 μm from the requirements of manufacturing described in the first embodiment, so that the length of the circular metal portion located on the substrate in the present embodiment which has two electrodes is 4 to 20 μm. In other words, it can be said that the ratio of the metal portion on the substrate is about 10% or less, preferably about 1%.

Although a structure in which the recess has only outer edges has been described, a doughnut-shaped recess including an inner edge may be used as a structure in which the metal portion is separated from both sides of the recess by a desired distance. This will be described in a fourth embodiment.

Fourth Embodiment

It is well known that an array of electromagnetic sensors can be used as a part of an image sensor. In particular, the image sensor can integrate an imaging optical system, a shutter, a signal processing device, and so on. Normally, the array of electromagnetic sensors is placed on the image plane of the imaging optical system and known as a focal plane array. Each element of the array forms a pixel of the image sensor.

The fourth embodiment relates to a device in which a plurality of pixels, each of which includes a metal portion and an electronic element on a recess, are provided in the form of an array. In particular, the fourth embodiment can be used as a focal plane array used in an image sensor operating in the THz range. A THz image sensor is expected to be applied to manufacturing, medical image diagnosis, and security.

Figure 7:
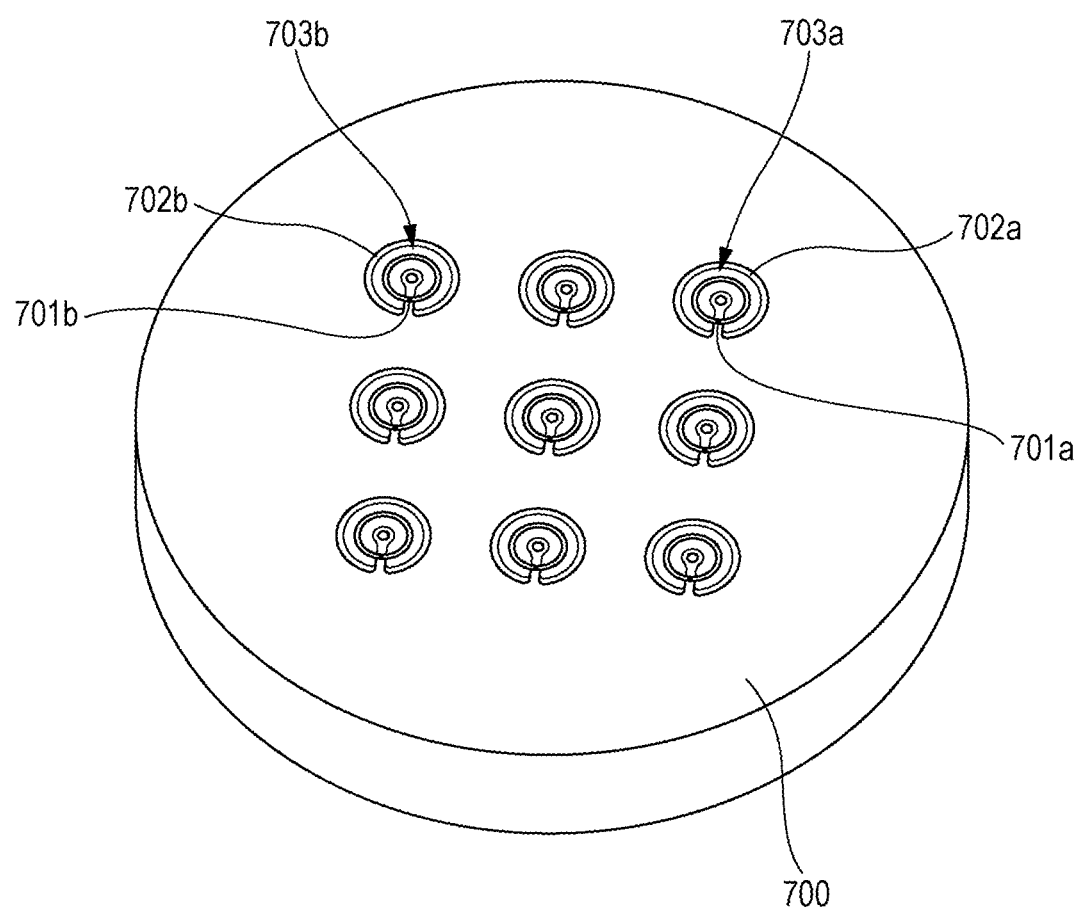
FIG. 7 is a perspective view of a nine-sensor array according to a device of the fourth embodiment of the present invention.

FIG. 7 shows a case in which a single substrate 700 includes a plurality of electronic elements 701*a* and 701*b*, a plurality of recesses 702*a* and 702*b*, and a plurality of metal portions 703*a* and 703*b*. FIG. 7 shows a 3×3 array of 9 pixels. The array is combined with CMOS switches or the like, an imaging optical system, a shutter, and other elements, and is provided as an image sensor. To provide an accurate image by the image sensor, it is necessary for each pixel to receive only information directed to the pixel and not to receive information of an electromagnetic wave which is directed to another pixel but arrives at the pixel because the electromagnetic wave propagates into the substrate. The phenomenon in which information is transmitted not to a pixel which should receive the information but to another pixel is known as crosstalk. In the present embodiment, the recess includes a wall covered by a metal layer, so that even if the pixels are provided as an array, it is possible to provide an array where the crosstalk is significantly reduced.

Figure 8:
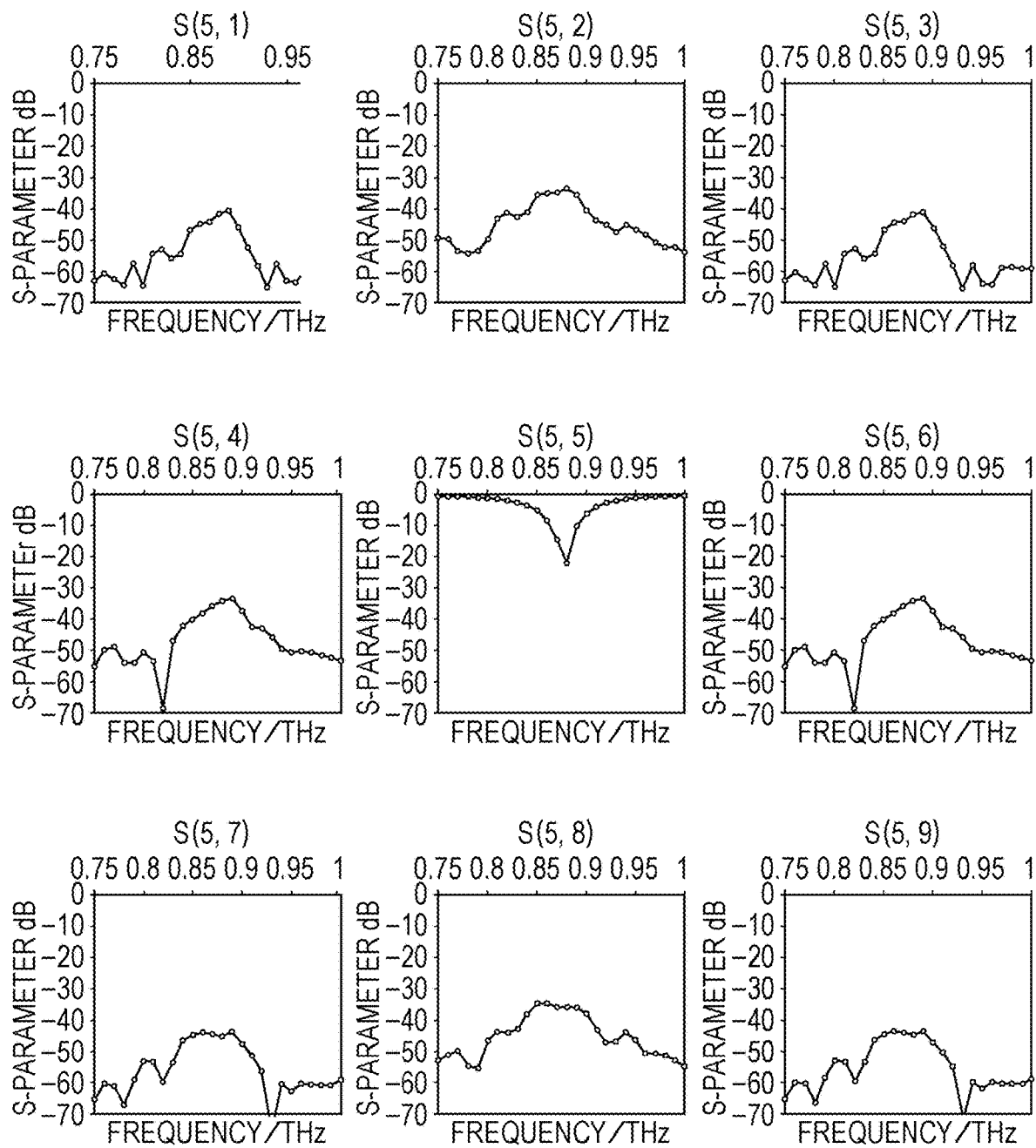
FIG. 8 is a diagram showing the S parameters of the nine-sensor array according to the device of the fourth embodiment simulated by the HFSS.

FIG. 8 shows the S parameter (scattering parameter) of each pixel with respect to the central pixel as a function of frequency around 1 THz when the central pixel is used as an emitter. The S parameter is calculated by using the commercially available simulator HFSS.

In FIG. 7, the pixels are given numbers 1 to 9 from left to right and top to bottom. For example, S(5, 1) corresponds to the pixel number 1 and indicates the pixel including the electronic element 701b, the recess 702b, and the metal portion 703b in FIG. 7. S(5, 3) corresponds to the pixel number 3 and indicates the pixel including the electronic element 701a, the recess 702a, and the metal portion 703a in FIG. 7. Except for S(5, 5), the S parameters characterize the crosstalk between two pixels.

The S parameter (5, 5) evaluates the impedance matching between the antenna and the electronic element. In this simulation, the resistance of the electronic element is set to 1000Ω. Although the size and the composition of the radiating element and the recess of each pixel are substantially the same as those in the third embodiment, each pixel has a doughnut-shaped recess 1102. In this case, the inner edge of the recess is located away from the metal portion 1103 by 45 μm. The radius of the inner part of the doughnut is set to 5 μm. The width W of the doughnut, is set to 90 μm. The substrate is formed of silicon and the distance between two neighboring pixels is 300 μm. This simulation indicates that the crosstalk is lower than −30 dB at about 1 THz whatever the relative position of the receiving pixel compared to that of the emitting pixel.

Figure 9:
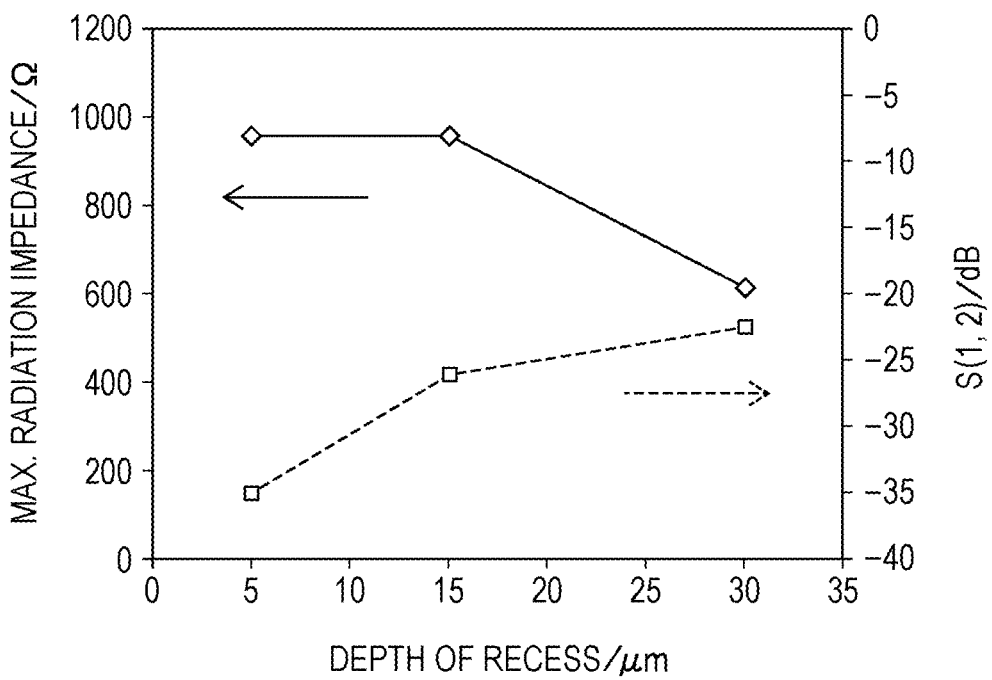
FIG. 9 is a diagram showing the radiation impedance and the recess depth dependence of the S parameter for a two-sensor array according to the device of the fourth embodiment simulated by the HFSS.
Figure 10:
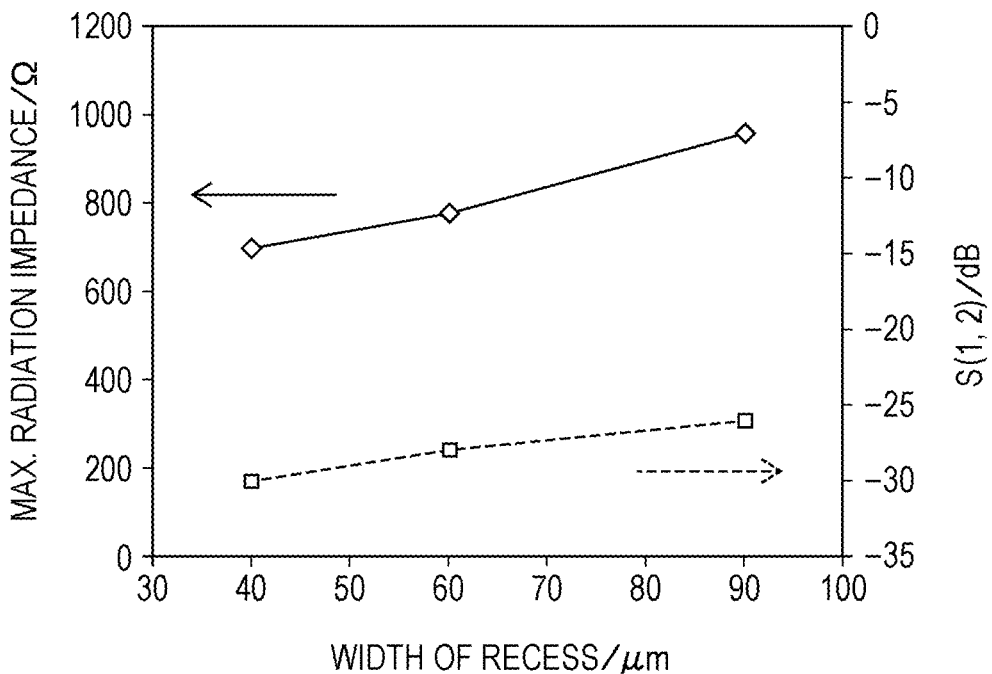
FIG. 10 is a diagram showing the radiation impedance and the recess width dependence of the S parameter of a two-sensor array according to the device of the fourth embodiment simulated by the HFSS.
Figure 11:
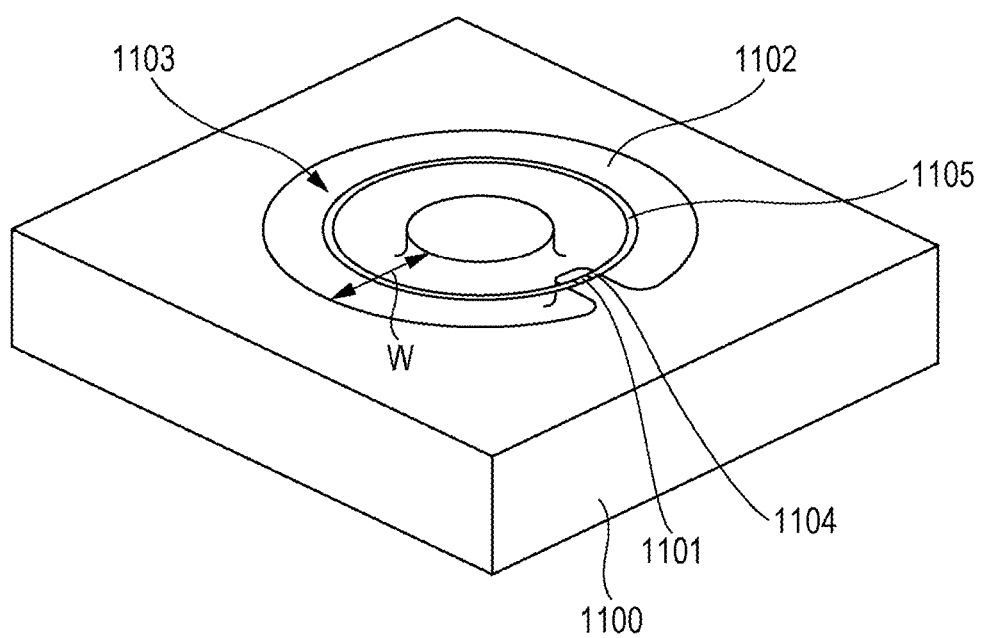
FIG. 11 is a perspective view showing a device having a doughnut-shaped recess according to the fourth embodiment of the present invention.
Figure 12:
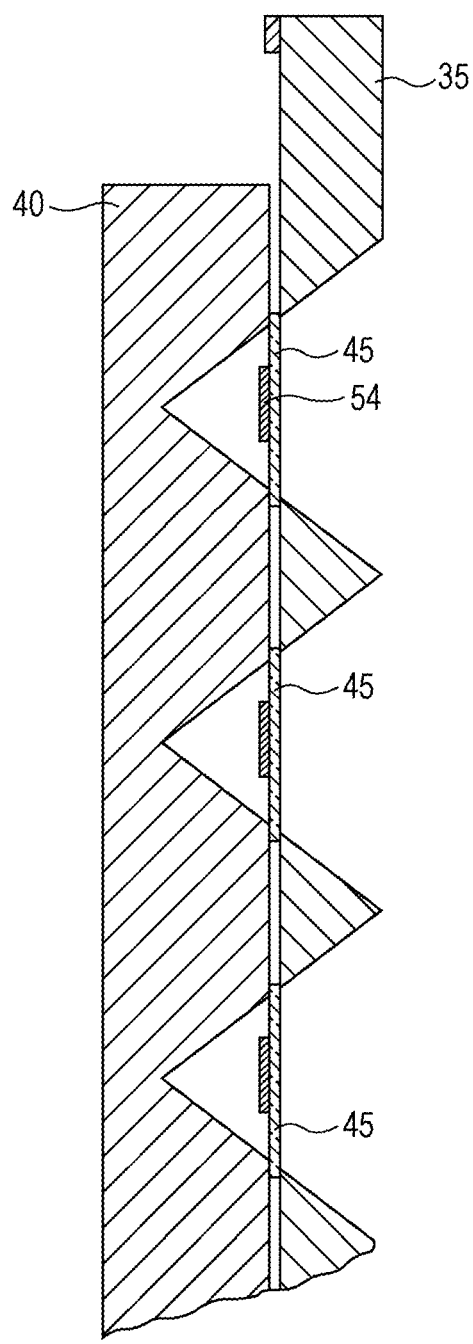
FIG. 12 is a diagram showing a device according to the background art.

Further, the S parameter (5, 5) indicates a good impedance matching between the radiating element and the electronic element at about 1 THz despite the high impedance of the electronic element. As a result, the present invention can give an important effect to the THz image sensor. The size of the recess affects the radiation impedance and the crosstalk. FIGS. 9 and 10 show the dependence of the radiation impedance and S(1, 2) with respect to the depth and the width of the recess, respectively, calculated by the commercially available simulator HFSS when two elements are integrated on one substrate. As described above, the width here is defined as the magnitude of W when the shape of a single element is that of a doughnut (the electrode is located at the center of W) as shown in FIG. 11. The greater the depth of the recess is, the lower the radiation impedance is, due to interference between the radiated electromagnetic wave and the electromagnetic wave reflected by the bottom of the recess. It is considered that the crosstalk represented by S(1, 2) increases because the deeper the recess, the smaller the density of the radiated electromagnetic wave with respect to the recess. On the other hand, when the depth of the recess decreases, the high radiation impedance is maintained. When the depth of the recess decreases, the electromagnetic wave concentrates on the substrate surface, so that the crosstalk is reduced. However, if the recess is too shallow, a large part of the energy of the electromagnetic wave is radiated into the substrate, so that the sensitivity degrades. When the width of the recess is reduced, the crosstalk is reduced, but the radiation impedance decreases. When the width of the recess is increased, the size of the device increases. Therefore, there is a limit to the width so that the device does not become too large. The simulation provides a specific example showing that the size of the recess affects operation, that is, the size of the recess according to the frequency (wavelength) of the radiated or received electromagnetic wave, is important to high radiation impedance and low crosstalk which are desirable characteristics.

The present embodiment further presents a desirable position of the wall of the recess described in the third embodiment. Specifically, from FIG. 10, it is known that the width of the recess is desired to be smaller than or equal to 100 μm, that is, the distance between the metal portion and the recess is desired to be 50 μm or less. In the present embodiment, it is designed so that high efficiency is obtained at 0.9 THz. The wavelength corresponding to the frequency is about 333 μm (free space), and when the recess is filled with BCB, which permittivity is about 2.5, the effective wavelength (wavelength/refractive index of BCB) is about 333/√2.5≈210 μm. Therefore, it can be said that a desirable distance from the metal portion to the reflective wall of the recess is about ¼ of the effective wavelength.

Fifth Embodiment

Another embodiment of the present invention will be described. In the present embodiment, a form related to a connection between the device described above and an external circuit will be described. The description of the components which have been described above will be omitted.

Figure 13A:
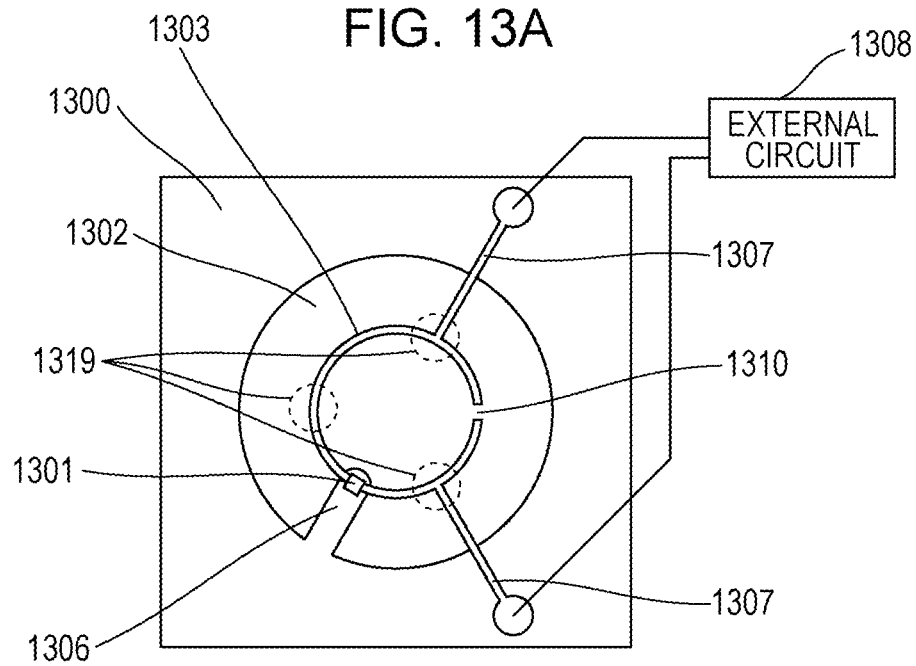
FIGS. 13A and 13B are diagrams for explaining a configuration of a device described in a fifth embodiment.
Figure 13B:
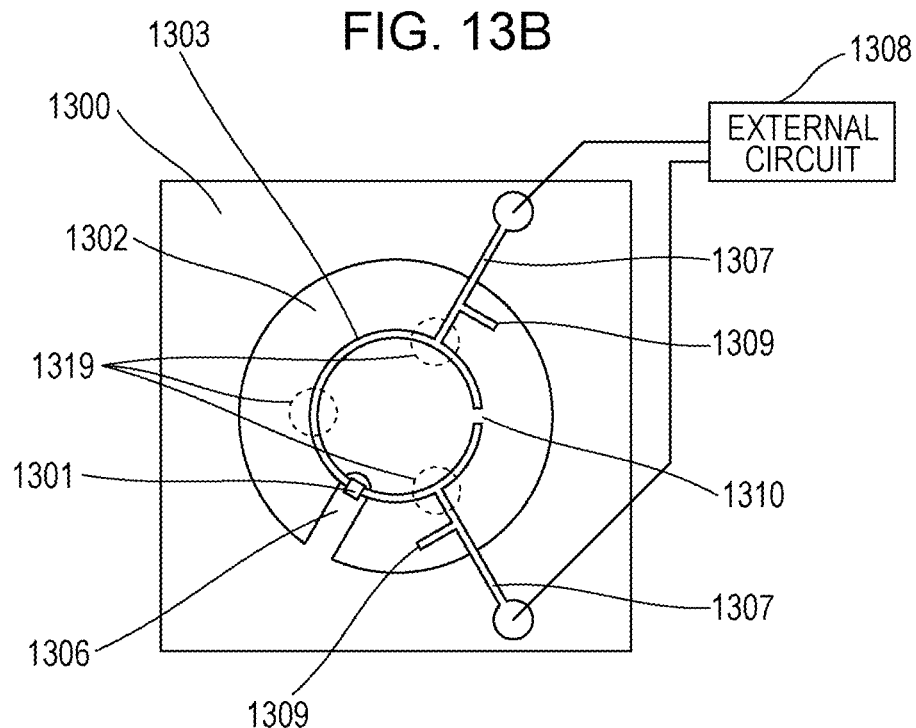

FIGS. 13A and 13B are diagrams for explaining the configuration of the device in the present embodiment. In FIG. 13A, a substrate 1300, an electronic element 1301, a recess 1302, and a metal portion 1303 are the same as those described above. In the substrate 1300, a portion that supports the above-described portion 104 which is located on the substrate and connects to the electronic element is called a first support portion 1306 in the present embodiment. A difference from the embodiments described above is that the device of the present embodiment is connected to an external circuit 1308 through a connection portion 1307 connected to the metal portion 1303. For example, the external circuit 1308 is a circuit which applies a signal to drive the electronic element 1301 or adjusts or processes a signal from the electronic circuit 1301. The connection portion 1307 is a metal line formed in the same process as the metal portion 1303.

As described above, when the metal portion 1303 functions as an antenna, the recess 1302 has a function to adjust the impedance matching between the electronic element 1301 and the metal portion 1303. When connecting the external circuit to the device, it is desired that the impedance matching of the device is maintained in order to maintain the characteristics of the device. Therefore, the connection portion 1307 of the present embodiment is connected to a node 1319 of the electromagnetic field distributed in the metal portion 1303. Moreover, the metal portion 1303 and the external circuit 1308 are connected to each other through the connection portion 1307.

Here, the node 1319 of the electromagnetic field is a position at which the impedance of the electromagnetic field distributed in the metal portion 1303 can be assumed to be zero with respect to an operating wavelength λ. In FIG. 13A, when a coil antenna of 1.5λ is selected as the metal portion 1303, the nodes 1319 of the electromagnetic field are located at the positions ¼λ, ¾λ, and 5/4λ from the electronic device 1301 which is taken as the starting point. The shape of the antenna used as the metal portion 1303 is not limited to this. The connection portion 1307 connected to the node 1319 of the electromagnetic field and the external circuit 1308 are assumed to be a circuit connected in parallel to a circuit whose impedance is zero. Therefore, the external circuit 1308 can be connected in a state in which the impedance matching between the electronic element 1 and the metal portion 1303 is maintained. As a result, the external circuit 1308 can be easily connected.

FIG. 13A shows an example in which the external circuit 1308 has two terminals. Here, the metal portion 1303 includes a slit 1310 to prevent the terminals of the external circuit 1308 from being short-circuited. Many circuits have two or more terminals such as a reference electrode and a signal line. Therefore, it is desired that the metal portion 1303 has two or more nodes 1319 of the electromagnetic field.

FIG. 13B shows an example in which the connection portion 1307 has a distributed constant filter. Here, a stub 1309 is used as the distributed constant filter. The stub 1309 is a metal line formed in the same process as the metal portion 1303 and the connection portion 1307. It is possible to provide a distributed constant filter to the connection portion 1307 by adjusting the shape of the stub 1309 and the position at which the stub 1309 is connected. For example, with respect to the operating wavelength $\lambda$, the stub 1309 having a length of $1/4\lambda$ is provided at a position of $1/4\lambda$ from the node 1319 of the electromagnetic field, so that a notch filter of the wavelength $\lambda$ can be formed. Although FIG. 13B shows an example of a rectangular stub 1309, stubs of various shapes such as, for example, fan-shape and L-shape in which the metal line is bent can be applied. Since the distributed constant filter is provided, the circuit including the electronic element 1301, the metal portion 1303, and the recess 1302 and the external circuit 1308 can be easily isolated from each other, so that the impedance matching state can be easily maintained. In particular, as shown in FIG. 13B, when the distributed constant filter is formed by the stub 1309 provided on the connection portion 1307, the shape of the stub 1309 can be adjusted in a back-end process. Therefore, it is possible to accurately adjust the characteristics of the distributed constant filter with respect to the operating wavelength $\lambda$, so that the yield rate of the device is improved.

Figure 14A:
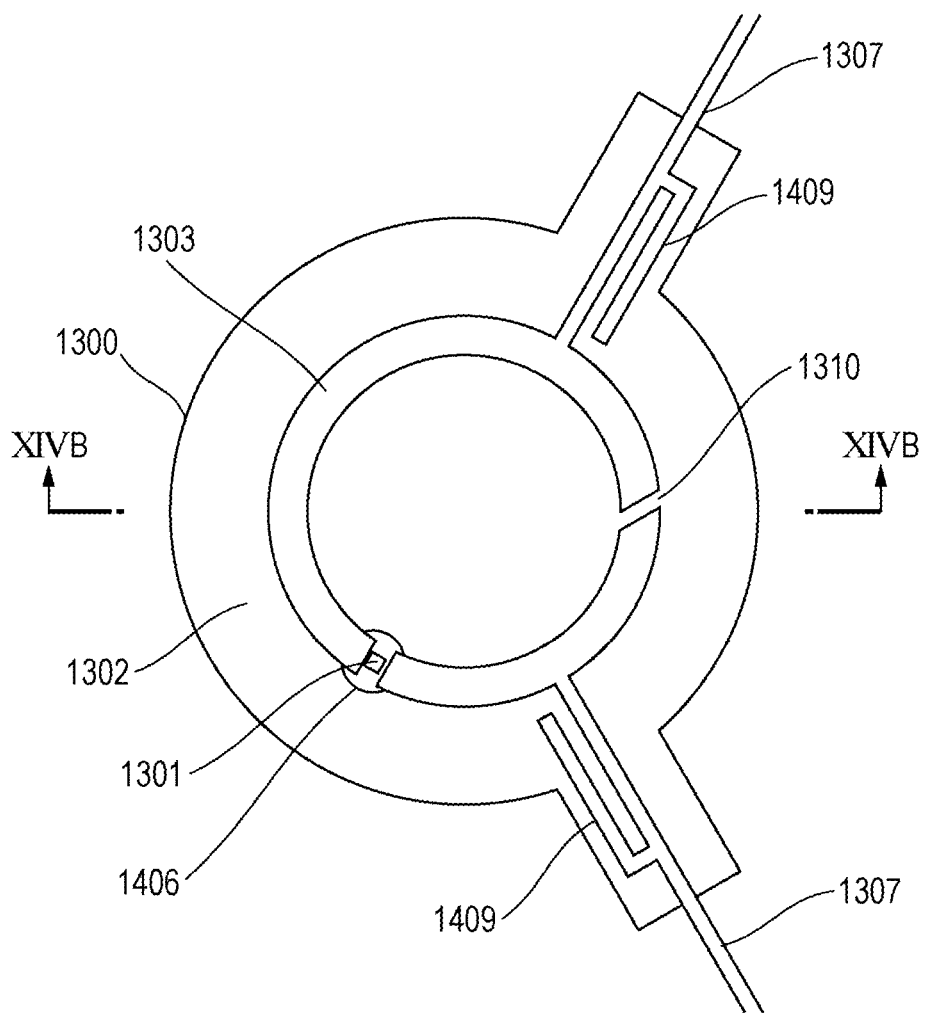
FIGS. 14A and 14B are diagrams for explaining a device configuration used for an analysis in the fifth embodiment.
Figure 14B:
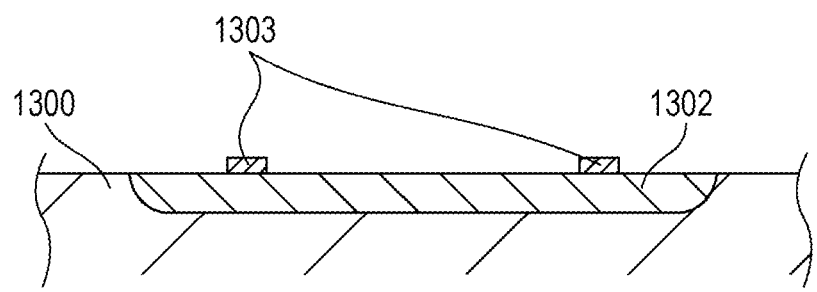

Next, an analysis result of the device of the present embodiment will be described. FIGS. 14A and 14B show a model used in the analysis and FIGS. 15A, 15B, 15C, and 16 show analysis results. The device shown in FIGS. 14A and 14B is manufactured by the same process as that of the devices of the embodiments described above, so that the detailed description of the manufacturing process will be omitted.

In FIGS. 14A and 14B, the substrate 1300 is a silicon substrate and the electronic element 1301 is a Schottky barrier diode. The recess 1302 provided in the substrate 1300 has a diameter of 150 μm and a depth of 10 μm. The portion where the bottom and the side wall of the recess 1302 intersect each other has a curved surface having a radius of 10 μm. As shown in FIGS. 14A and 14B, the recess 1302 includes a depression having a length of 40 μm and a width of 30 μm along the connection portion 1307. The depth of the depression is 10 μm and a portion where the bottom and the side wall intersect each other has a circular shape having a radius of 10 μm. As shown in FIGS. 14A and 14B, the recess 1302 is formed in the substrate 1300 while the first support portion 1406 remains. While the first support portion 1306 shown in FIG. 13A has a bracket shape extending from the edge of the recess 1302, the first support portion 1406 shown in FIG. 14A has a pillar shape extending from the bottom of the recess 1302. Metal is coated on the surface of the recess 1300. The recess 1302 is filled with BCB (benzocyclobutene) and the metal portion 1303 is supported by the BCB and the first support portion 1306. The metal portion 1303 is an electric conductor having an inside diameter of 80 μm and an outside diameter of 100 μm and functions as a coil antenna of $1.5\lambda$. The electronic element 1301 is connected to a part of the metal portion 1303. In FIG. 14A, it is assumed that a current flowing in the metal portion 1303 flows in a clockwise direction in the metal portion 1303 and this direction is defined as positive. At this time, the nodes 1319 (not shown in FIGS. 14A and 14B) of the electromagnetic field are located at positions of $1/4\lambda$, $3/4\lambda$, and $5/4\lambda$ in the positive direction from the electronic device 1301 which is taken as the starting point. In FIG. 14A, the connection portions 1307 are disposed at positions of $3/4\lambda$ and $5/4\lambda$. The line width of the connection portion 1307 is 4 μm. The line length of the connection portion 1307 is 500 μm. An L-shaped stub 1409 is formed at a position 50 μm away from an intersection point between the metal portion 1303 and the connection portion 1307. The line width of the L-shaped stub 1409 is 4 μm and the total length of the L-shaped stub 1409 is 50 μm. The L-shaped stub 1409 is bent at a position 4 μm away from the intersection point between the connection portion 1307 and the L-shaped stub 1409 so that the end portion of the L-shaped stub 1409 faces the metal portion 1303. Here, 50 μm corresponds to $1/4\lambda$ of the operating wavelength $\lambda$ and the L-shaped stub 1409 functions as a distributed constant filter. The connection portion 1307 and the L-shaped stub 1409 are metal conductors and are manufactured in the same process as the metal portion 1303. Since the external circuit 1308 not shown in the drawings is assumed to be a circuit having two terminals, a slit 1310 is formed in the metal portion 1303 to electrically separate the two connection portions 1307 from each other.

FIGS. 15A, 15B, and 15C are an analysis result related to the directivity of the electromagnetic field of the device shown in FIGS. 14A and 14B. Specifically, only the metal portion included in the device is extracted and analyzed. The atmosphere of the analysis here is vacuum. FIG. 15A is an analysis result of a device which includes only the metal portion 1303 and does not include the connection portion 1307 and the L-shaped stub 1409. FIG. 15B is an analysis result of a device including the metal portion 1303 and the connection portion 1307. FIG. 15C is an analysis result of a device including the metal portion 1303, the connection portion 1307, and the stub 1409. The shape of the stub 1409 is the same as that of the device shown in FIG. 14A. Since the purpose of the analysis is to check the directivity of the antenna, the analysis is performed without using the substrate 1300 and the recess 1302. In FIGS. 15A, 15B, and 15C, a slight side lobe and a broadening of the directivity is observed in the directivity of the antenna for the devices in which the connection portion 1307 is disposed on the metal portion 1303. This is caused by the effect of the electromagnetic field distributed near the connection portion 1307. The effect of the electromagnetic field distributed in the connection portion 1307 can be controlled by the stub 1309 that functions as a distributed constant filter. In particular, it is found that the L-shaped stub 1409 shown in FIG. 14A exhibits a high suppression effect on the effect of the electromagnetic field distributed in the connection portion 1307 as a result of hard study on the shape of the stub 1309. When comparing FIG. 15A and FIG. 15C, it is known that the directivities of the two antennas are similar to each other. The reason of this is considered as follows: The end portion of the L-shaped stub 1409 faces the metal portion 1303, so that the directions of the currents distributed in the connection portion 1307 and the L-shaped stub 1409 are opposite to each other. As a result, the electromagnetic fields leaking from the connection portion 1307 and the L-shaped stub 1409 suppress each other. It is possible to fine-tune the electromagnetic fields distributed inside and outside the metal portion 1303 by adjusting the angle and the shape of the slit 1310 in FIG. 14A, so that the directivities of the antennas shown in FIGS. 15A, 15B, and 15C is adjusted.

Figure 16:
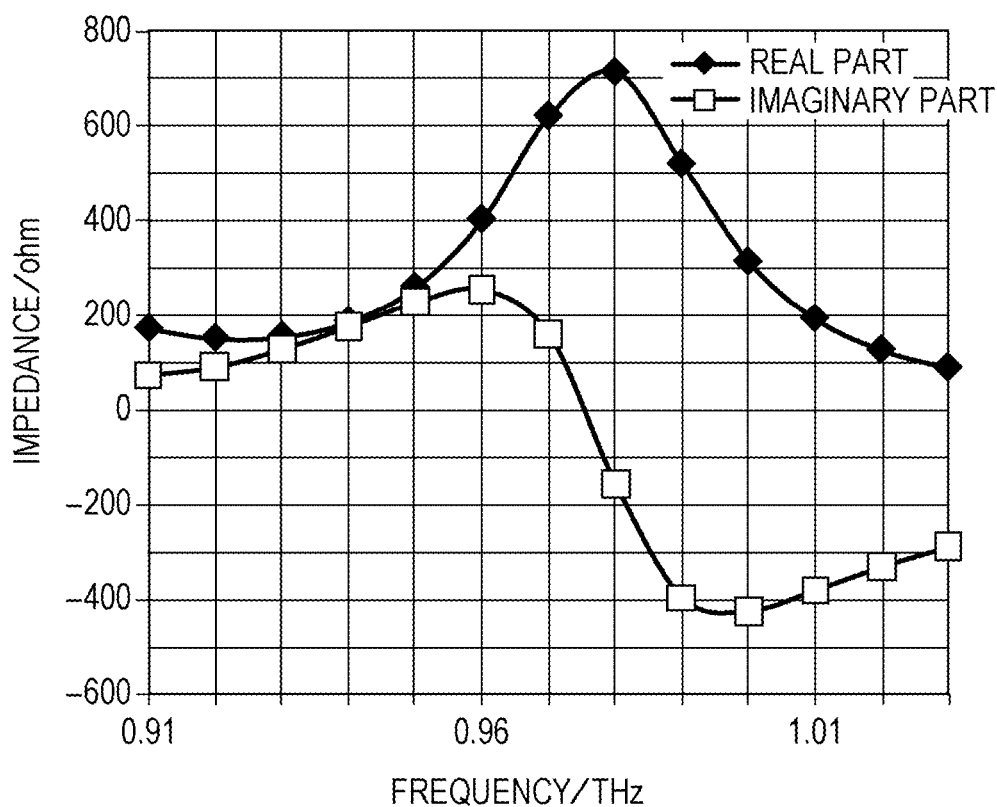
FIG. 16 is an analysis result related to radiation impedance of the device of the fifth embodiment.

FIG. 16 is an analysis result of the impedance of the device shown in FIGS. 14A and 14B. When observing FIG. 16, it is known that a high impedance of about 700Ω can be obtained in an operating frequency range of 0.97 to 0.98 THz even when the connection portion 1307 is disposed.

Sixth Embodiment

Another embodiment of the present invention will be described. Specifically, the present embodiment is a modified example related to the configuration for supporting the metal portion described above. The description of the same components as those described above will be omitted.

Figure 17A:
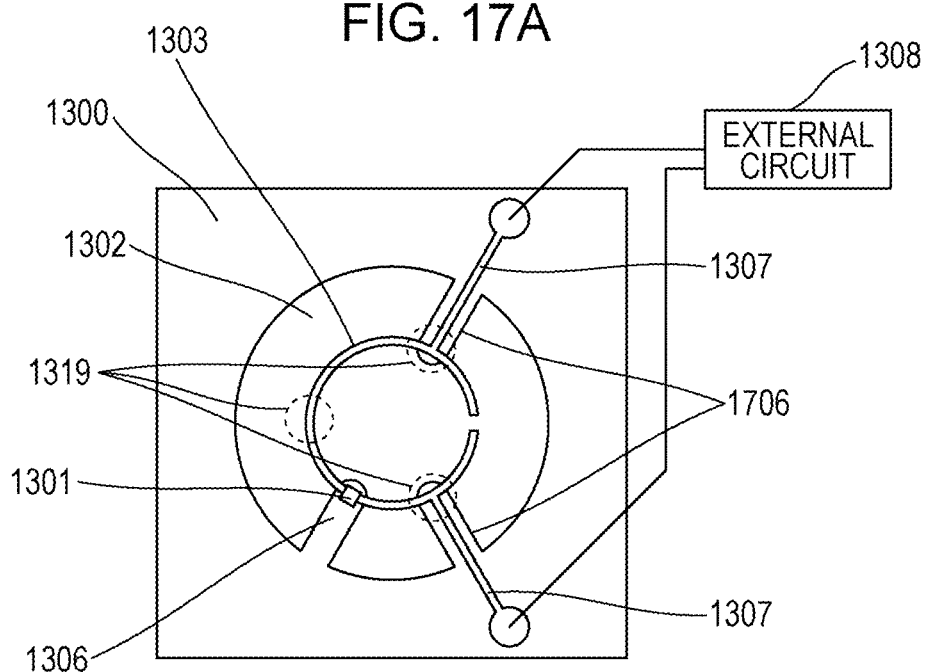
FIGS. 17A and 17B are diagrams for explaining a configuration of a device of the sixth embodiment.
Figure 17B:
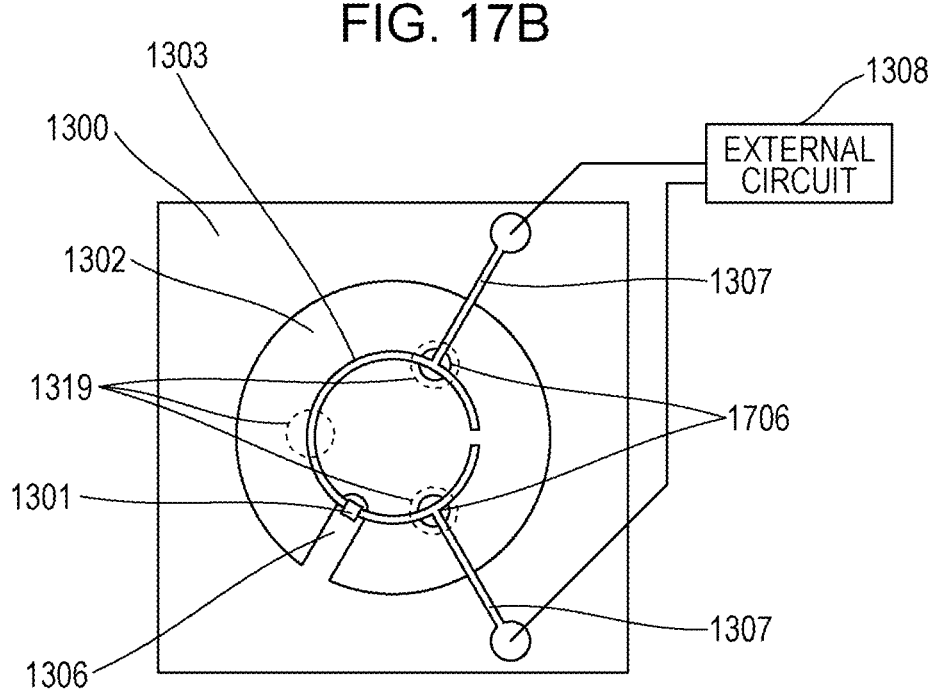

FIGS. 17A and 17B are diagrams for explaining a configuration of a device of the present embodiment. The difference from the devices described above is that the device of the present embodiment includes second support portions 1706 for supporting the metal portion 1303 on the nodes 1319 of the electromagnetic field distributed in the metal portion 1303. The variation of the impedance of the device due to the support portions is controlled by supporting the metal portion 1303 at the nodes 1319 of the electromagnetic field. FIG. 17A shows a configuration example in which the second support portions 1706 have the same bracket shape as that of the first support portion 1306. Here, the above-described connection portion 1307 is disposed on the second support portion 1706. FIG. 17B shows a configuration example in which the second support portions 1706 have a pillar shape. The second support portions 1706 are formed of the same material as that of the substrate 1300 in the same manner as the first support portion 1306.

The metal portion 1303 can be supported in the air by using the second support portions 1706. As a result, it is possible to suppress the loss due to the material and to improve the generation efficiency of the electromagnetic wave from the device and the detection efficiency of the electromagnetic wave.

It is desired to support the metal portion 1303 at three points to reliably support the metal portion 1303 while maintaining the posture of the metal portion 1303. Therefore, it is desirable that there are two or more second support portions 1706. Therefore, it is desired that the metal portion 1303 has a form that functions as an antenna including two or more nodes 1319 of the electromagnetic field at the operating wavelength $\lambda$.

Seventh Embodiment

Another embodiment of the present invention will be described. Specifically, the present embodiment is a modified example related to the distributed constant filter described in the fifth embodiment. The description of the same components as those described above will be omitted.

Figure 18A:
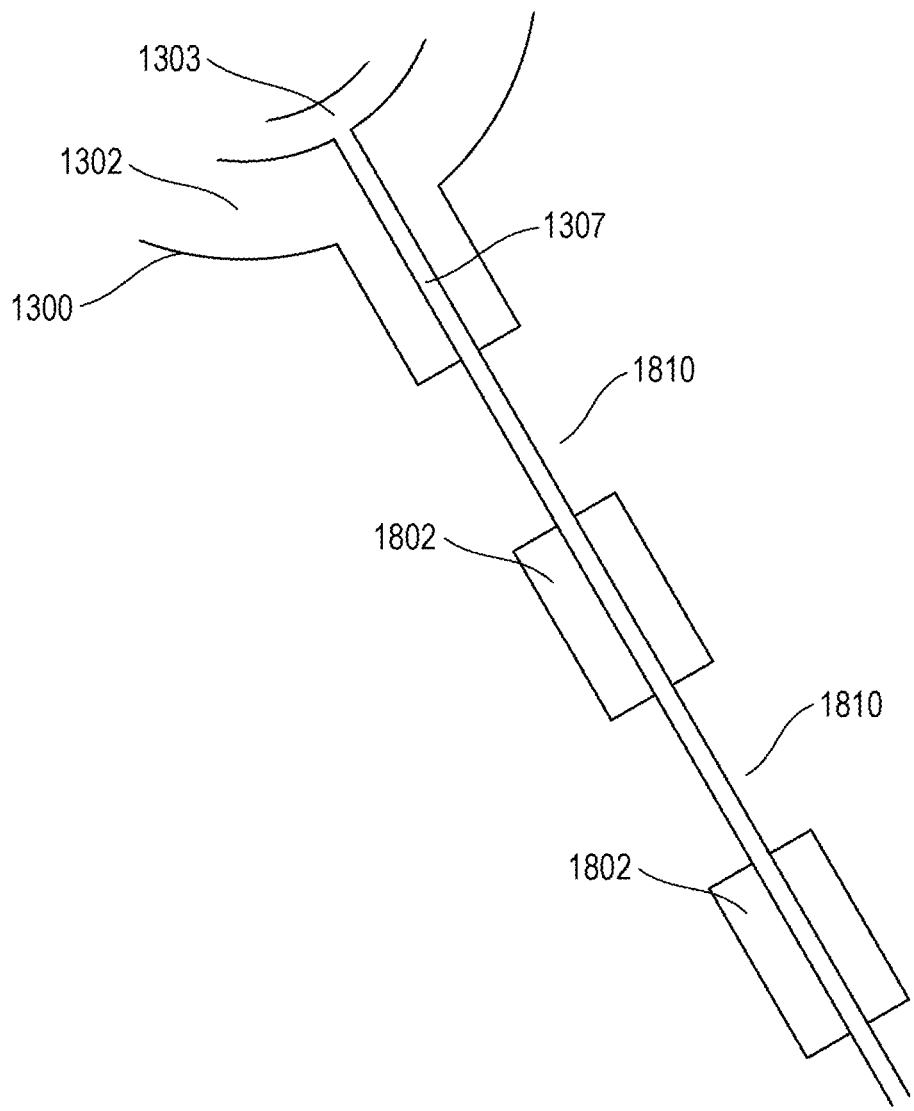
FIGS. 18A and 18B are diagrams for explaining a configuration of a device of the seventh embodiment.
Figure 18B:
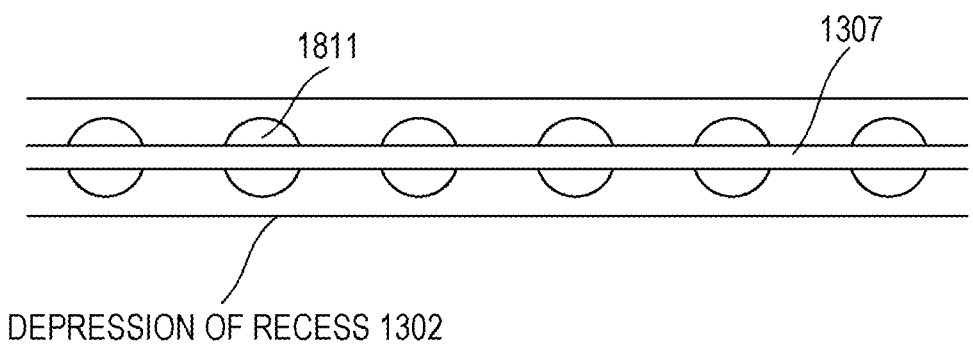

FIGS. 18A and 18B are diagrams for explaining a configuration of a device of the present embodiment. Although the distributed constant filter described above is formed by the stub 1309 disposed on the connection portion 1307, the distributed constant filter of the present embodiment is formed by a periodic structure provided on the substrate 1300. Specifically, a structure whose period is ½λ with respect to the operating wavelength λ is disposed along the connection portion 1307 as the periodic structure. In FIG. 18A, the periodic structure is realized by alternately arranging bridge portions 1810 formed of the same material as that of the substrate 1300 and second recesses 1802 along the connection portion 1307. When the recess 1302 has depressions as shown in FIG. 14A, the periodic structure may have a configuration as shown in FIG. 18B. In FIG. 18B, the periodic structure is realized by periodically arranging pillar portions 1811 formed of the same material as that of the substrate 1300 in the depression of the recess 1302. According to the configuration described above, the electromagnetic wave propagating in the connection portion 1307 has a periodic refractive index change. As a result, the distributed constant filter blocks the electromagnetic wave of the operating wavelength λ.

As described above, the distributed constant filter provided on the connection portion 1307 is realized by a periodic structure formed on the substrate 1300, so that it is not necessary to pattern a new metal material. Thus, the installation space of the device can be small.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

An image sensor using the device according to the present invention is expected to be applied as a sensor that can be used for manufacturing application, medical image diagnosis, and safety application.

Although the embodiments of the present invention have been described, the present invention is not limited to those embodiment and various variations and modifications can be made without departing from the scope of the invention.

The invention claimed is:

1. A device for receiving a terahertz wave, the device comprising:
   a substrate that is provided with a recess therein, the recess having a side surface and a bottom surface in a cross-sectional view;
   an antenna having a coil shape;
   a rectifying element; and
   a support portion that supports at least a part of the antenna on an upper surface of the support portion,
   wherein the support portion is surrounded by the side surface of the recess,
   wherein the support portion has an extending portion that extends to inside of the recess in a planar view, and
   wherein the antenna is connected to the rectifying element on the support portion.

2. The device according to claim 1, wherein the recess has a shape along the antenna.

3. The device according to claim 1, wherein the recess has a circular shape.

4. The device according to claim 1, wherein the recess has a doughnut-shaped recess.

5. The device according to claim 1, wherein the antenna is a loop antenna.

6. The device according to claim 3, wherein the antenna is a loop antenna.

7. The device according to claim 1, wherein the rectifying element is a Schottky barrier diode.

8. An image sensor having a substrate and a plurality of terahertz wave receiving devices, each of the plurality of terahertz wave receiving devices comprising:
- a recess provided in the substrate, the recess having a side surface and a bottom surface in a cross-sectional view;
- an antenna having a coil shape;
- a rectifying element; and
- a support portion that supports at least a part of the antenna on an upper surface of the support portion
- wherein the support portion is surrounded by the side surface of the recess,
- wherein the support portion has an extending portion that extends to inside of the recess in a planar view, and
- wherein the antenna is connected to the rectifying element on the support portion.

9. The image sensor according to claim 8, wherein the recess has a shape along the antenna.

10. The image sensor according to claim 8, wherein the recess has a circular shape.

11. The image sensor according to claim 8, wherein the recess has a doughnut-shaped recess.

12. The image sensor according to claim 8, wherein the antenna is a loop antenna.

13. The image sensor according to claim 10, wherein the antenna is a loop antenna.

14. The image sensor according to claim 8, wherein the rectifying element is a Schottky barrier diode.

15. The image sensor according to claim 8, wherein extending directions of a plurality of the support portions from the side surface of the recess to the inside of the recess are the same.

16. The image sensor according to claim 8, further comprising a CMOS circuit configured to process signals from the plurality of terahertz wave receiving devices.

* * * * *